April 27, 1926. 1,582,414
J. B. McCREADY
VINE TURNER ATTACHMENT FOR CULTIVATORS
Filed April 7, 1925
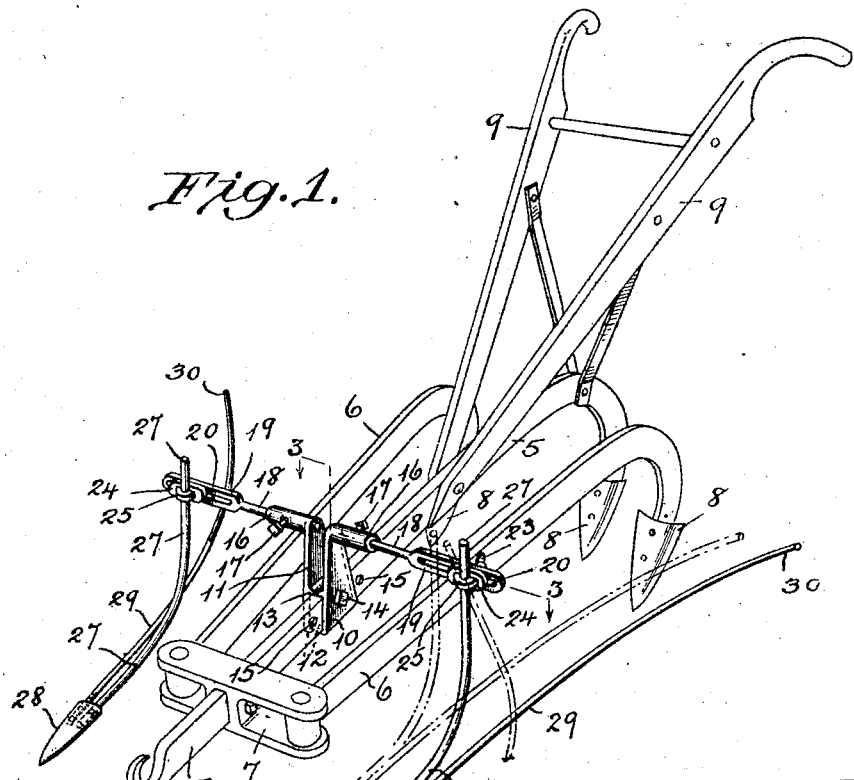
Fig. 1.
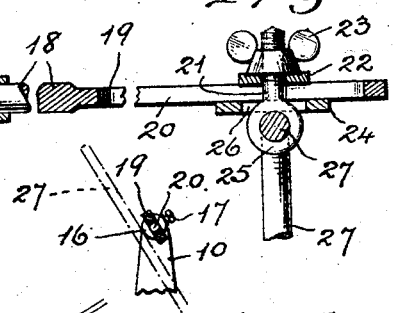
Fig. 3.
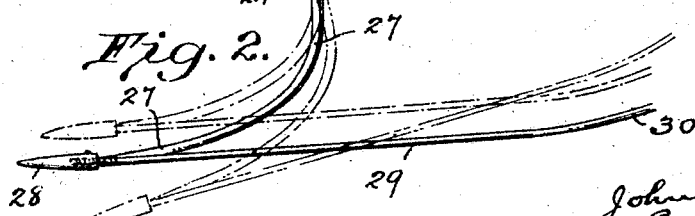
Fig. 5.
Fig. 2.
Fig. 4.
Inventor
John B. McCready
By Charles B. Mann Jr
Attorney Patented Apr. 27, 1926.

1,582,414

UNITED STATES PATENT OFFICE.

JOHN B. McCREADY, OF PARKSLEY, VIRGINIA.

VINE-TURNER ATTACHMENT FOR CULTIVATORS.

Application filed April 7, 1925. Serial No. 21,266.

*To all whom it may concern:*

Be it known that JOHN B. MCCREADY, a citizen of the United States, residing at Parksley, in the county of Accomac and State of Virginia, has invented certain new and useful Improvements in Vine-Turner Attachments for Cultivators, of which the following is a specification.

This invention relates to an improved vine-turner attachment for cultivators and is directed to an adjustable device for turning vines laterally out of the path of the cultivator hoes to prevent such vines from being cut or injured during the cultivating operation.

The object of the invention is to provide an improved vine-turning mechanism which may be readily adjusted to suit the width of the rows and the character of the vines under cultivation.

With these objects in view the accompanying drawing illustrates the invention, wherein,—

Fig. 1 shows a cultivator with the improved vine-turning devices attached thereto—the view showing the entire structure in perspective.

Fig. 2 illustrates the vine-turning elements of the structure in side elevation and also shows by broken lines two of the many positions to which the same may be adjusted.

Fig. 3 shows an enlarged horizontal sectional detail through the adjustable supporting devices as the same would appear if viewed on the line 3—3 of Fig. 1.

Fig. 4 illustrates a cross-sectional detail through the slotted bar which carries the turner blade and clamp, and Fig. 5 shows one of the detached bracket-plates in perspective.

Referring to the drawing the numeral 5, designates the center draft-bar of the cultivator and 6—6 the two side bars of the same,—the forward ends of said side bars being attached to a cross-wise head 7, which latter is carried on the center draft-bar.

The rear ends of the center and side bars of the cultivator curve downwardly and forwardly and each of said ends carries a hoe 8.

A suitable handle 9 is attached to the cultivator and projects rearwardly therefrom in the usual manner.

To the center draft-bar 5 of the cultivator, I attached two bracket-plates 10 and 11 respectively;—the plates being of like construction so that a description of one will apply also to the other.

Each bracket-plate consists of a vertically-extending plate which is broader at its lower edge than at its upper end and on the inner side each plate has two inwardly or laterally-projecting horizontal lugs or flanges 12 and 13, one above the other so that the center draft-bar may project between said flanges or lugs. This arrangement of spaced horizontal flanges or lugs at the inner side of the plate enables said inner plate-side to be seated against the vertical side of the center draft-bar with the lower flange 12 projecting beneath the bar and the upper flange 13 extending over said bar so that fore and aft rocking of the plate on the bar will be prevented.

When the two bracket-plates are thus placed at opposite sides of the center draft-bar a single bolt 14, may be passed through one plate, then through the center bar and finally through the other plate and thereby rigidly hold the two plates at opposite sides of said center draft-bar.

The center draft-bar 5, is preferably provided with a plurality of cross-wise extending perforations 15, so that the positions of said plates may be varied in a direction longitudinally of said bar.

At the narrower upper end, each bracket-plate is provided with a tubular arm 16 which extends in a horizontal direction and outwardly from the outer side of each plate.

A set screw 17 is provided in each tubular arm for a purpose that will presently be explained.

In each tubular arm 16 there is inserted one end of a horizontally-extending rod 18 and the other or outer end of each of these rods has a flat portion 19 with a horizontal slot 20 extending longitudinally therein.

When these rods 18 are in place in the tubular arms 16 they extend laterally for a distance over the side bars 6 for the flattened and slotted outer ends to have position in a vertical plane beyond the outer vertical sides of the said side bars.

Through the slot 20 of each flattened end 19 of the bars 18, there extends an eye-bolt 21,—a washer 22 and wing-nut 23, being provided on the threaded end of the bolt and having position at one flat side of the bar while a slotted plate 24 and the eye 25, of the bolt are positioned at the opposite flat side of said bar.

It is to be noted, by reference to Fig. 3 of the drawing, that the slot 26 in the plate 24 is of sufficient dimension to permit the eye-end 25 of the bolt 21, to pass therethrough.

A rod 27 has an upper end which extends through the eye of the bolt 21 and seats against the vertical front face of the slotted plate 24 both above and below the slot 26 in said plate and when the wing-nut 23, is screwed up tightly, the eye-bolt draws the said rod 27, rearwardly and clamps said rod rigidly against said slotted plate. This rod 27 is therefore vertically adjustable along the flat side 19 of the bar 18 because of the horizontal slot 20.

It will also be seen that the rod 27, and the eye-bolt may be swung to an inclined position with respect to the flat side of the bar 18 because the eye-bolt can be rotated in the slot 20 and that the one wing-nut 23 will lock the eye-bolt and rod in any of the positions just referred to so that any of these adjustments may be quickly and readily made.

The rods 27 extend downwardly and curve forwardly from the eye-bolt and their lower ends are rigidly secured in a pointed block or head 28, as clearly shown in Figs. 1 and 2 of the drawing and from said block or head there extends a separate rod 29 which latter projects rearwardly toward the hoes 8 but has an outwardly-curved rear end 30. The rod 29, is also rigidly attached to the blocks or heads 28 so that any adjustment made to rod 27 will also affect the positions of the blocks or heads 28 and the rods 29.

From the foregoing explanation, it will be understood that the point-ends of the blocks or heads 28, together with the forward ends of rods 27 and 29 may be swung down or up by rotating or turning rod 18, in the tubular arms 16 and then locking the said rod 18 by the set bolt 17.

Thus it will be seen that numerous adjustments may be made in the positioning of the point-end of the blocks or head 28, through the manipulation of the set-bolt 17 and the wing-nut 23 so that the rods 27 and 29 and blocks or heads 28, may be properly adjusted to turn vines of various kinds irrespective of their stages of cultivation,—the vines being engaged by the rearwardly-extending rods 29 and turned laterally and out of the path of the hoes 8.

Having described my invention, I claim:—

1. The combination with a cultivator having a bar, of bracket-plates secured to opposite sides of said bar and each bracket having a laterally-projecting tubular arm, a horizontal rod carried by each tubular arm and each rod being provided with a slotted outer end, an eye-bolt clamp device carried in the slot of each rod and vine-turner rods sustained from the eye-bolts.

2. The combination with a cultivator having a bar, of bracket-plates seated against opposite sides of the bar and each plate having a tubular arm extending laterally therefrom, a horizontal rod adjustably held in each tubular arm and each rod having a flattened and slotted outer end, an eye-bolt extending through the slot of each rod, clamp means for drawing the eye-bolt laterally through said slot to adjustably hold the same in said slot and vine-turner rods carried by each eye-bolt and held by the said clamping means therein.

In testimony whereof I affix my signature.

JOHN B. McCREADY.